(12) United States Patent
Chen et al.

(10) Patent No.: US 10,465,427 B2
(45) Date of Patent: Nov. 5, 2019

(54) ELECTRONIC DEVICE AND HINGE ASSEMBLY THEREOF

(71) Applicants: Po-Jui Chen, Taipei (TW); Wei-Hao Lan, Taipei (TW); Che-Hsien Lin, Taipei (TW); Chen-Cheng Wang, Taipei (TW); Chun-Chieh Chen, Taipei (TW); Chia-Chi Lin, Taipei (TW); Han-Sheng Siao, Taipei (TW)

(72) Inventors: Po-Jui Chen, Taipei (TW); Wei-Hao Lan, Taipei (TW); Che-Hsien Lin, Taipei (TW); Chen-Cheng Wang, Taipei (TW); Chun-Chieh Chen, Taipei (TW); Chia-Chi Lin, Taipei (TW); Han-Sheng Siao, Taipei (TW)

(73) Assignee: COMPAL ELECTRONICS, INC., Taipei (TW)

(*) Notice: Subject to any disclaimer, the term of this patent is extended or adjusted under 35 U.S.C. 154(b) by 0 days.

(21) Appl. No.: 15/891,314

(22) Filed: Feb. 7, 2018

(65) Prior Publication Data
US 2018/0230726 A1 Aug. 16, 2018

Related U.S. Application Data

(60) Provisional application No. 62/484,886, filed on Apr. 13, 2017, provisional application No. 62/456,629, filed on Feb. 8, 2017.

(51) Int. Cl.
*E05D 11/10* (2006.01)
*G06F 1/16* (2006.01)
(Continued)

(52) U.S. Cl.
CPC ............ *E05D 11/10* (2013.01); *E05D 3/12* (2013.01); *E05D 3/18* (2013.01); *E05D 3/186* (2013.01);
(Continued)

(58) Field of Classification Search
CPC .... G06F 1/1681; G06F 1/1613; G06F 1/1615; G06F 1/1616; E05D 11/10; E05D 3/12; E05D 3/18; E05D 3/186
See application file for complete search history.

(56) References Cited

U.S. PATENT DOCUMENTS

| 9,388,617 B2 | 7/2016 | Onda |
| 2010/0041448 A1* | 2/2010 | Gaddy ................ G06F 1/1616 455/575.3 |

(Continued)

FOREIGN PATENT DOCUMENTS

| CN | 102606616 | 7/2012 |
| CN | 103161819 | 4/2015 |

(Continued)

OTHER PUBLICATIONS

"Office Action of Taiwan Counterpart Application", dated Nov. 5, 2018, p. 1-p. 4.

*Primary Examiner* — Nidhi Thaker
(74) *Attorney, Agent, or Firm* — JCIPRNET (57) ABSTRACT

An electronic device and a hinge assembly thereof are provided. The hinge assembly has a first fixing block, a second fixing block, a first linking rod and a second linking rod. The first fixing block has a first end and a second end. The second fixing block has a third end and a fourth end. The first linking rod has a fifth end slidably and rotatably connected to the second end and a sixth end rotatably connected to the fourth end. The second linking rod has a seventh end slidably and rotatably connected to the fourth end and an eighth end rotatably connected to the second end. The sixth end has a groove portion and a first inclined surface, and the eighth end has a second inclined surface contacting the first inclined surface.

17 Claims, 5 Drawing Sheets

(51) Int. Cl.
*E05D 3/12* (2006.01)
*E05D 3/18* (2006.01)
*E05D 5/04* (2006.01)
*E05D 15/06* (2006.01)
*E05D 11/08* (2006.01)
*H04M 1/02* (2006.01)

(52) U.S. Cl.
CPC .............. *E05D 5/04* (2013.01); *E05D 11/087* (2013.01); *E05D 15/0604* (2013.01); *G06F 1/1681* (2013.01); *H04M 1/022* (2013.01); *E05D 2011/1092* (2013.01); *E05Y 2900/606* (2013.01); *H04M 1/0216* (2013.01)

(56) References Cited

U.S. PATENT DOCUMENTS

| | | | |
|---|---|---|---|
| 2011/0263304 A1* | 10/2011 | Laido | G06F 1/1616 455/575.3 |
| 2012/0120618 A1* | 5/2012 | Bohn | G06F 1/1618 361/749 |
| 2012/0227217 A1* | 9/2012 | Chen | G06F 1/1681 16/366 |
| 2013/0021722 A1* | 1/2013 | Guo | G06F 1/1616 361/679.01 |
| 2013/0061700 A1* | 3/2013 | Mitsui | G06F 1/1615 74/105 |
| 2013/0192140 A1* | 8/2013 | Sayama | G06F 1/1616 49/386 |
| 2014/0168878 A1* | 6/2014 | Jheng | G06F 1/1681 361/679.27 |
| 2017/0138103 A1* | 5/2017 | Hong | E05D 3/18 |
| 2017/0264723 A1* | 9/2017 | Mok | G06F 1/1652 |

FOREIGN PATENT DOCUMENTS

| | | | | |
|---|---|---|---|---|
| JP | 05006040 A | * | 1/1993 | ............ E05D 3/186 |
| TW | M538310 | | 3/2017 | |
| WO | 2013118924 | | 8/2013 | |

* cited by examiner

ELECTRONIC DEVICE AND HINGE ASSEMBLY THEREOF

CROSS-REFERENCE TO RELATED APPLICATION

This application claims the priority benefits of U.S. provisional application Ser. No. 62/456,629 filed on Feb. 8, 2017 and U.S. provisional application Ser. No. 62/484,886, filed on Apr. 13, 2017. The entirety of each of the above-mentioned patent applications is hereby incorporated by reference herein and made a part of this specification.

BACKGROUND

Technical Field

The disclosure relates to an electronic device and a hinge assembly, and more particularly relates to an electronic device and a hinge assembly thereof.

Description of Related Art

A common clamshell electronic device such as a laptop computer or a mobile phone usually adopts a hinge assembly to pivot the display to the main body. A user may use the hinge assembly to make the two casings of the electronic device open and close with respect to each other so as to use or fold the electronic device.

In detail, the hinge assembly generally provides a fixed torsional output to the clamshell electronic device such that the display and the main body do not generate different kinds of torsion due to different opening/closing positions during the process of opening and closing. However, it may not be possible to secure the display at a predetermined position due to an insufficient torsion provided by the hinge assembly, or it may not be possible to buffer the force that the user applies to rotate the display to the opening position. Besides, the user may not be able to smoothly open the casings due to an excessive torsion generated during the process of rotating the display from the closing position to the opening position.

SUMMARY

The disclosure provides a hinge assembly that may adaptively adjust the torsion.

The disclosure provides an electronic device that is convenient for users to use.

A hinge assembly of the disclosure includes a first fixing block, a second fixing block, a first linking rod and a second linking rod. The first fixing block has a first end and a second end. The second fixing block has a third end and a fourth end. The first linking rod has a fifth end and a sixth end, wherein the fifth end is slidably and rotatably connected to the second end, and the sixth end is rotatably connected to the fourth end. The second linking rod has a seventh end and an eighth end, wherein the seventh end is slidably and rotatably connected to the fourth end, and the eighth end is rotatably connected to the second end. The sixth end has a groove portion and a first inclined surface, the eighth end has a second inclined surface, and the first inclined surface contacts the second inclined surface.

An electronic device of the disclosure includes a first casing, a second casing and a hinge assembly. The hinge assembly includes a first fixing block, a second fixing block, a first linking rod and a second linking rod. The first fixing block has a first end and a second end, and the first end is attached to the first casing. The second fixing block has a third end and a fourth end, and the third end is attached to the second casing. The first linking rod has a fifth end and a sixth end, wherein the fifth end is slidably and rotatably connected to the second end, and the sixth end is rotatably connected to the fourth end. The second linking rod has a seventh end and an eighth end, wherein the seventh end is slidably and rotatably connected to the fourth end, and the eighth end is rotatably connected to the second end. The sixth end has a groove portion providing elastic deformation and a first inclined surface, the eighth end has a second inclined surface, and the first inclined surface contacts the second inclined surface.

A hinge assembly of the disclosure includes a first fixing block, a second fixing block, a first linking rod and a second linking rod. The first linking rod is slidably and rotatably connected to the first fixing block and rotatably connected to the second fixing block. The second linking rod is slidably and rotatably connected to the second fixing block, rotatably connected to the first fixing block, and rotatably connected to the first linking rod.

An electronic device of the disclosure includes a first casing, a second casing, a first fixing block, a second fixing block, a first linking rod and a second linking rod. The first fixing block is attached to the first casing, and the second fixing block is attached to the second casing. The first linking rod is slidably and rotatably connected to the first fixing block and rotatably connected to the second fixing block. The second linking rod is slidably and rotatably connected to the second fixing block, rotatably connected to the first fixing block, and rotatably connected to the first linking rod.

A hinge assembly of the disclosure includes a first linking rod and a second linking rod. The first linking rod has a groove portion and a first inclined surface, and the second linking rod is rotatably connected to the first linking rod and has a second inclined surface. Herein the first inclined surface contacts the second inclined surface, and the first inclined surface is located between the groove portion and the second inclined surface.

Based on the foregoing, in the hinge assembly of the disclosure, due to the contact between the first inclined surface of the sixth end of the first linking rod and the second inclined surface of the eighth end of the second linking rod, when the first fixing block and the second fixing block are rotated, the degree of interference between the first inclined surface and the second inclined surface increases to provide a torsion. At the same time, the torsion may be adaptively adjusted due to the elastic deformation provided by the groove portion, so that the first casing and the second casing of the electronic device equipped with such kind of hinge assembly may be secured at a predetermined angle.

To make the aforementioned and other features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
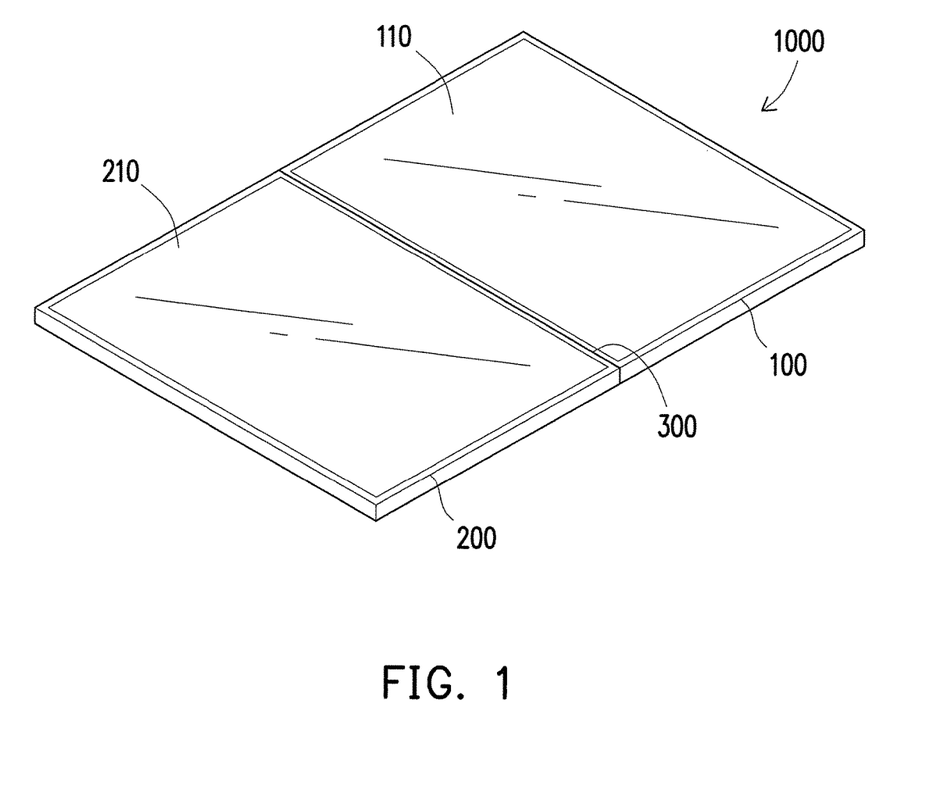
FIG. 1 is a schematic view showing an electronic device according to an embodiment of the disclosure.
Figure 2:
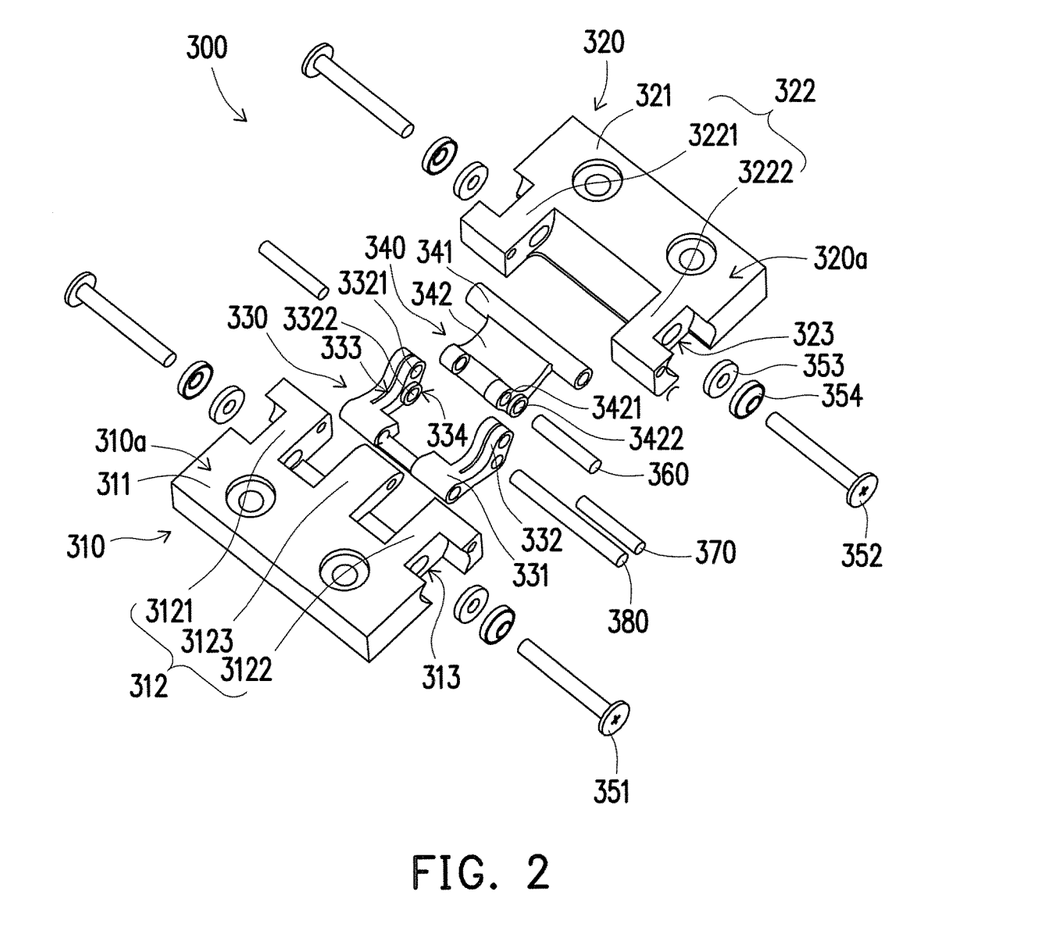
FIG. 2 is a schematic exploded view showing a hinge assembly of the electronic device of FIG. 1.
Figure 3:
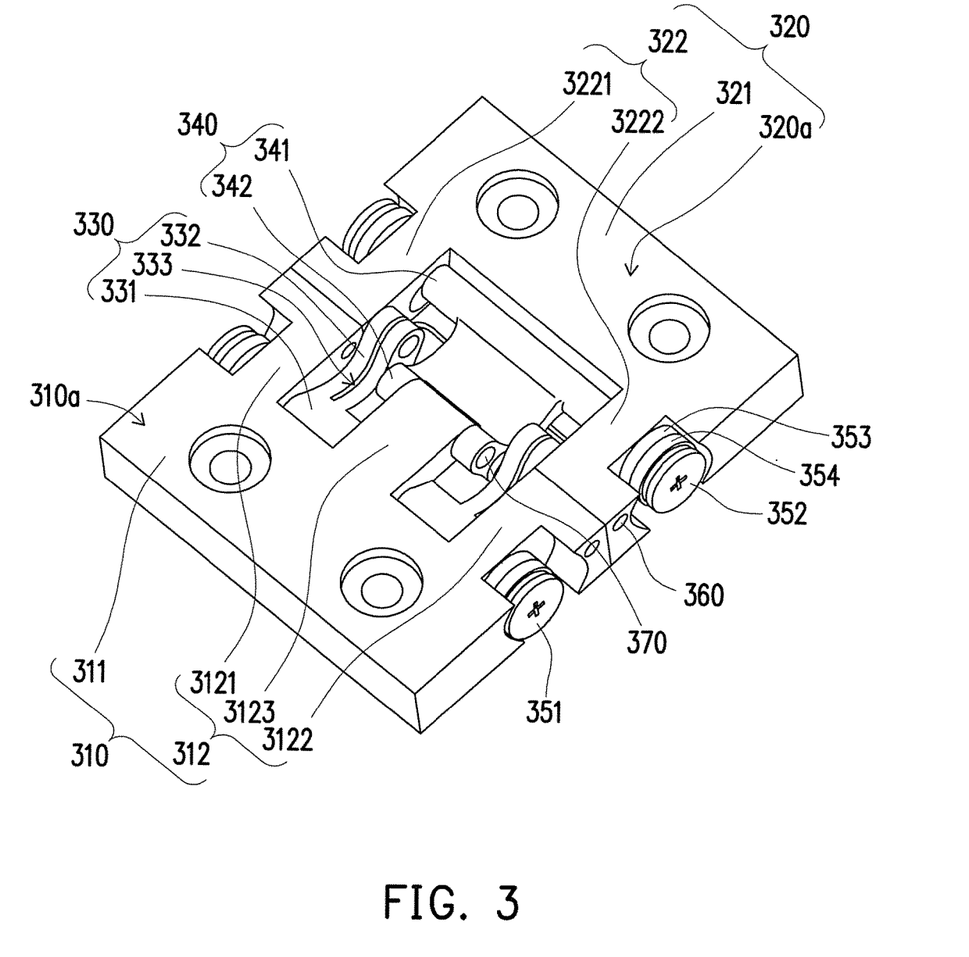
FIG. 3 is a schematic assembly view showing the hinge assembly of FIG. 2.

FIG. 1 is a schematic view showing an electronic device according to an embodiment of the disclosure. FIG. 2 is a schematic exploded view showing a hinge assembly of the electronic device of FIG. 1. FIG. 3 is a schematic assembly view showing the hinge assembly of FIG. 2. With reference to FIG. 1, FIG. 2 and FIG. 3 simultaneously, an electronic device 1000 includes a first casing 100, a second casing 200 and a hinge assembly 300. In this embodiment, the electronic device 1000 is a laptop computer, and herein the first casing 100 has a first display portion 110, and the second casing 200 has a second display portion 210 or a keyboard portion. The hinge assembly 300 includes a first fixing block 310, a second fixing block 320, a first linking rod 330 and a second linking rod 340. The first fixing block 310 has a first end 311 and a second end 312, and the first end 311 is attached to the first casing 100. The second fixing block 320 has a third end 321 and a fourth end 322, and the third end 321 is attached to the second casing 200. The first linking rod 330 has a fifth end 331 and a sixth end 332. Herein the fifth end 331 is slidably and rotatably connected to the second end 312, and the sixth end 332 is rotatably connected to the fourth end 322. The sixth end 332 may be a pair of coupling arms, and each of the pair of coupling arms has a groove portion 333 and a first inclined surface 334. The two first inclined surfaces 334 are located between the two groove portions 333.

The second linking rod 340 has a seventh end 341 and an eighth end 342. The seventh end 341 is slidably and rotatably connected to the fourth end 322, and the eighth end 342 is also rotatably connected to the second end 312. The second end 312 has a first sub-portion 3121, a second sub-portion 3122 and a third sub-portion 3123 that is located between the first sub-portion 3121 and the second sub-portion 3122, so that the second end 312 is substantially in an epsilon shape. Herein the eighth end 342 is rotatably connected to the third sub-portion 3123.

Particularly, the sixth end 332 has the groove portion 333, which provides an elastic deformation, and the first inclined surface 334, the eighth end 342 has a second inclined surface 343, and the first inclined surface 334 contacts the second inclined surface 343. When the first fixing block 310 and the second fixing block 320, from a parallel state, are rotated with respect to each other such that the included angle between them becomes smaller, the sixth end 332 and the eighth end 342 are driven to be rotated with respect to each other, and the degree of interference between the first inclined surface 334 and the second inclined surface 343 increases to provide a torsion to secure the first fixing block 310 and the second fixing block 320 at a predetermined angle. The torsion may be adaptively adjusted via the elastic deformation provided by the groove portion 333.

The hinge assembly 300 further includes a plurality of first sliding shafts 351. Herein the first fixing block 310 and the first linking rod 330 are assembled together via the first sliding shafts 351. In detail, each of the first sub-portion 3121 and the second sub-portion 3122 has a sliding slot 313, and the first sliding shaft 351 passes through the sliding slot 313 to correspondingly penetrate into the fifth end 331 of the first linking rod 330.

Based on the same configuration concept, the hinge assembly 300 further includes a plurality of second sliding shafts 352, and the fourth end 322 of the second fixing block 320 has a fourth sub-portion 3221 and a fifth sub-portion 3222. Herein each of the fourth sub-portion 3221 and the fifth sub-portion 3222 has a sliding slot 323, and the second sliding shaft 352 passes through the sliding slot 323 to correspondingly penetrate into the seventh end 341 of the second linking rod 340.

Besides, the hinge assembly 300 may further include a plurality of first washers 353 and a plurality of second washers 354. Herein a shaft portion of the first sliding shaft 351 passes through the corresponding first washer 353 and the corresponding second washer 354 in sequence to penetrate into the corresponding sliding slot 313, and a shaft portion of the second sliding shaft 352 passes through the corresponding first washer 353 and the corresponding second washer 354 in sequence to penetrate into the corresponding sliding slot 323. In this embodiment, the first washer 353 and the second washer 354 may be a combination of a flat washer and a locking washer or a bowl-shaped washer. The flat washer may prevent surface damage of the components and increase the contact area to disperse the pressure, and the locking washer may prevent the loosening of the interconnecting components and prevent the rotation of the shaft portion. Although two washers are given as an example in this embodiment, people skilled in the art may increase or decrease the variety and the number of the washers as required.

The hinge assembly 300 further includes a first fixing shaft 360, a second fixing shafts 370 and a third fixing shaft 380. The eighth end 342 of the second linking rod 340 is rotatably connected to the third sub-portion 3123 of the second end 312 of the first fixing block 310 by the first fixing shaft 360. The fourth sub-portion 3221 and the fifth sub-portion 3222 of the fourth end 322 of the second fixing block 320 are rotatably connected to the sixth end 332, which consists of a pair of coupling arms, by the second fixing shafts 370. The eighth end 342 of the second linking rod 340 is rotatably connected to the second end 312 of the first fixing block 310 by the third fixing shaft 380. The sixth end 332 that consists of a pair of coupling arms may be arc-shaped, and the eighth end 342 may also be arc-shaped.

In more detail, the eighth end 342 has a pair of first shaft holes 3421 and a pair of fourth shaft holes 3422, and the sixth end 332 that consists of a pair of coupling arms has a pair of second shaft holes 3321 and a pair of third shaft holes 3322. The first fixing shaft 360 penetrates through the first shaft holes 3421 and the third sub-portion 3123. The fourth sub-portion 3221 and the fifth sub-portion 3222 of the second fixing block 320 are rotatably connected to the second shaft holes 3321 by the second fixing shafts 370. The third fixing shaft 380 is disposed to pass through the third shaft holes 3322 and the fourth shaft holes 3422.

Figure 4A:
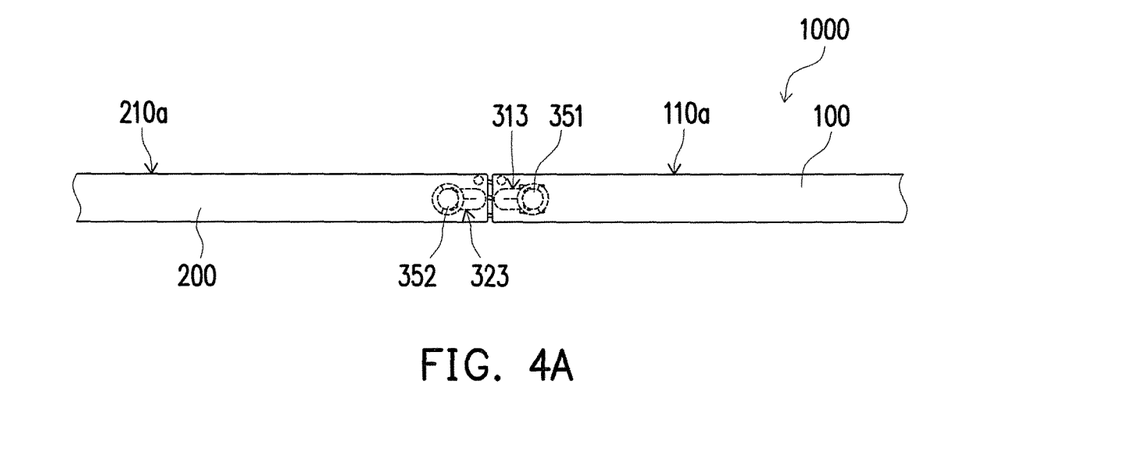
FIG. 4A is a schematic cross-sectional view showing the electronic device when it is completely opened.
Figure 4B:
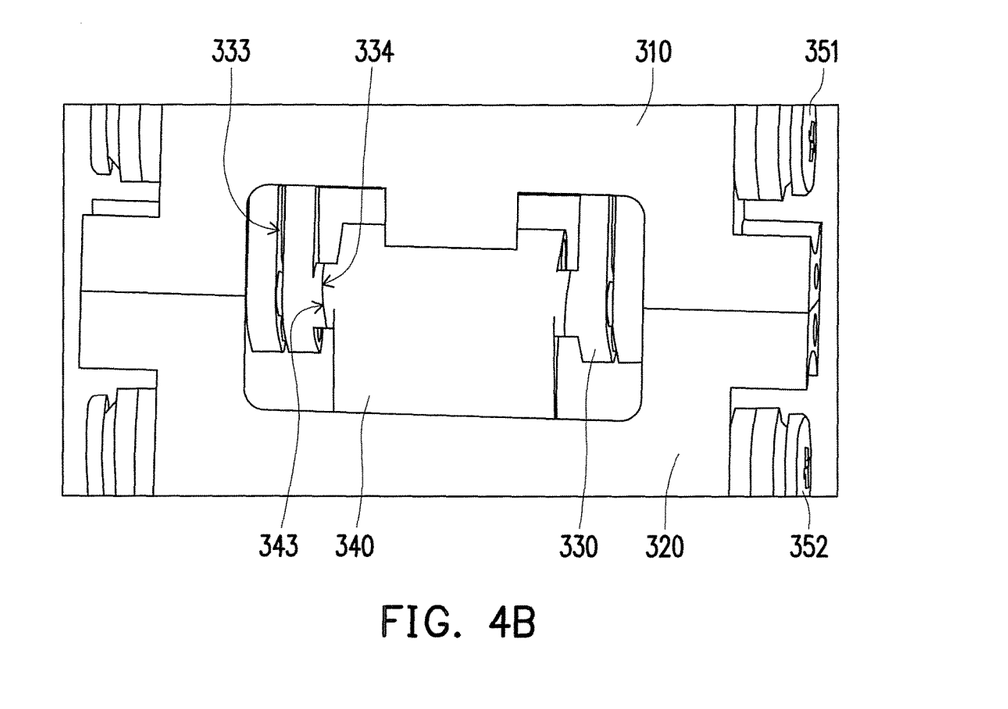
FIG. 4B is a partial enlarged view of FIG. 4A.

FIG. 4A is a schematic cross-sectional view showing the electronic device when it is completely opened. FIG. 4B is a partial enlarged view of FIG. 4A and presents the hinge assembly 300 of FIG. 3 from another viewing angle. With reference to FIG. 3, FIG. 4A and FIG. 4B simultaneously, when the first casing 100 is completely opened with respect to the second casing 200 (that is, the included angle between the first casing 100 and the second casing 200 is 180 degrees), the first fixing block 310 and the second fixing block 320 are also parallel to each other. When a first surface 310a of the first fixing block 310 is a top surface, a second surface 320a of the second fixing block 320 is also a top surface. Alternatively, when the first surface 310a of the first fixing block 310 is a bottom surface, the second surface 320a of the second fixing block 320 is also a bottom surface. The top surface or the bottom surface referred to herein is illustrated based on what is shown in FIG. 3. People ordinarily skilled in the art should know that after the viewing angle is changed, descriptions about the position (such as front, rear, left, right, up, and down) will change as well due to the different reference point. For example, the top surface in FIG. 3 is the bottom surface in FIG. 4B. Since the first surface 310a and the second surface 320a are designed to be coplanar, a first casing surface 110a of the first casing 100 (or a first display surface of the first display portion 110) and a second casing surface 210a of the second casing 200 (or a second display surface of the second display portion 210) may be designed to be coplanar when the electronic device 1000 is completely opened (that is, when the included angle between the first casing 100 and the second casing 200 is 180 degrees). In this way, the first display portion 110 and the second display portion 210 may be integrated into one large and leveled display surface, and the gap between the first casing 100 and the second casing 200 is minimized. Besides, at this time, the first inclined surface 334 and the second inclined surface 343 are in close contact with each other.

Figure 5A:
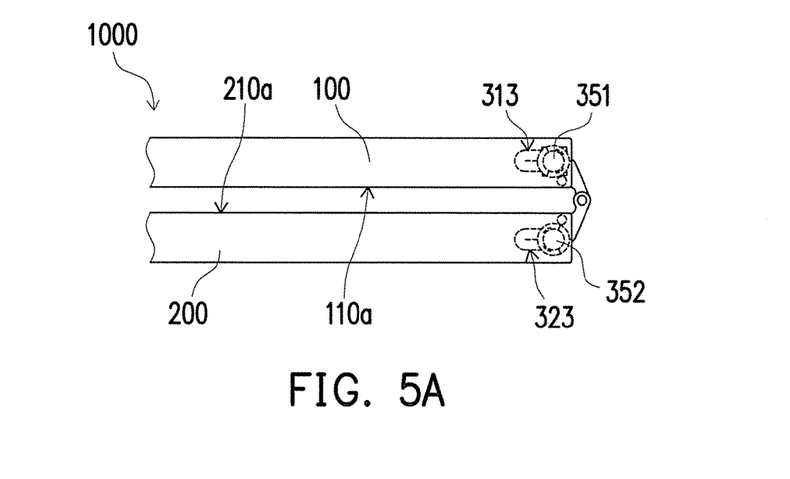
FIG. 5A is a schematic view showing the electronic device when it is folded.
Figure 5B:
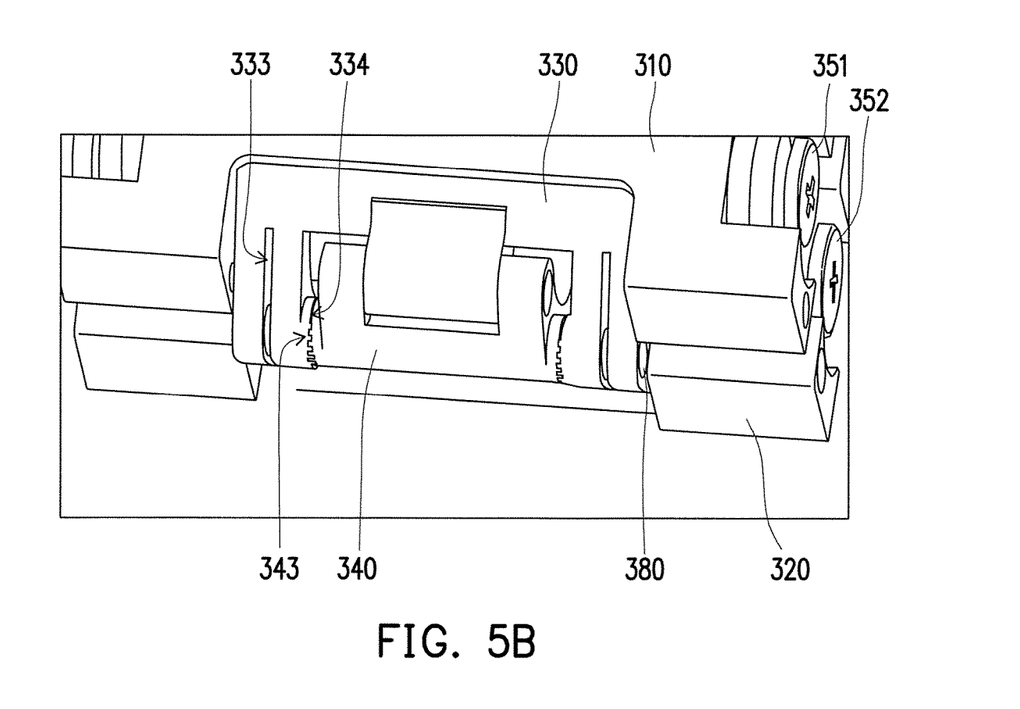
FIG. 5B is a partial enlarged view of FIG. 5A.

FIG. 5A is a schematic view showing the electronic device when it is folded, and FIG. 5B is a partial enlarged view of FIG. 5A. With reference to FIG. 2, FIG. 5A and FIG. 5B simultaneously, when the first casing 100 and the second casing 200 of the electronic device 1000 are folded, the user turns the first casing 100 with respect to the second casing 200 by using the hinge assembly 300 as a rotation axis. Herein the first casing 100 drives the first fixing block 310 attached thereto to rotate along when the first casing 100 is turned. Since the sixth end 332 of the first linking rod 330 and the fourth sub-portion 3221 and the fifth sub-portion 3222 of the fourth end 322 of the second fixing block 320 are pivoted together by the second fixing shafts 370, the first linking rod 330 and the second fixing block 320 may be rotated with respect to each other but may not be translationally moved with respect to each other. And the first sliding shaft 351 passing through the sliding slot 313 of the first fixing block 310 and penetrating into the fifth end 331 of the first linking rod 330 moves along the sliding slot 313. At this time, the first fixing block 310 is further rotated with respect to the second fixing block 320 around the third fixing shaft 380 that penetrates through the third sub-portion 3123.

At the same time, since the third sub-portion 3123 of the second end 312 of the first fixing block 310 and the fourth shaft holes 3422 of the eighth end 342 of the second linking rod 340 are pivoted together by the third fixing shaft 380, and since the second sliding shaft 352 passes through the sliding slot 323 of the fourth end 322 of the second fixing block 320 to penetrate into the seventh end 341 of the second linking rod 340, when the first fixing block 310 is moved and rotated with respect to the second fixing block 320, the first fixing block 310 drives the second linking rod 340 such that the second sliding shaft 352 is moved in the sliding slot 323 of the fourth end 322 of the second fixing block 320.

With reference to FIG. 2, FIG. 4B and FIG. 5B simultaneously, particularly, when the first fixing block 310 is rotated with respect to the second fixing block 320, the sixth end 332 and the eighth end 342 that are pivoted together by the third fixing shaft 380 are also rotated with respect to each other. As the rotation angles of the sixth end 332 and the eighth end 342 change, the degree of interference between the first inclined surface 334, which is located at the inner side of the sixth end 332 consisting of a pair of coupling arms, and the second inclined surface 343, which is located at the outer side of the eighth end 342, also gradually increases so as to provide a sufficient torsion to secure the first casing 100 at a fixed angle with respect to the second casing 200.

Besides, the sixth end 332 further has the groove portion 333 at the outer side that is opposite to the first inclined surface 334. In the case where the degree of interference between the first inclined surface 334 and the second inclined surface 343 gradually increases, a reaction force may damage the structure, and the configuration of the groove portion 333 may provide a margin for deformation to adjust and cushion the reaction force caused by the interference between the first inclined surface 334 and the second inclined surface 343, thereby preventing the occurrence of fractures due to an excessive torsion.

It should also be noted that the degree of interference between the first inclined surface 334 and the second inclined surface 343 in FIG. 5B is indicated by zigzag shapes, and the area where the zigzag shapes are larger means that the degree of interference there is greater.

In summary, in the electronic device and the hinge assembly thereof of this disclosure, by the configuration of the inclined surfaces, the torsion increases as the angle between the first casing and the second casing decreases. At the same time, the configuration of the groove portion provides a margin for deformation so as to adjust the reaction force caused by the increasing degree of interference between the first inclined surface and the second inclined surface. As a result, the structure may be kept undamaged to provide the torsion that secures the first casing and the second casing at a predetermined angle.

Although the embodiments are already disclosed as above, these embodiments should not be construed as limitations on the scope of the disclosure. It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A hinge assembly, comprising:
   a first fixing block having a first end and a second end;
   a second fixing block having a third end and a fourth end;
   a first linking rod having a fifth end and a sixth end, wherein the fifth end is slidably and rotatably connected to the second end, and the sixth end is rotatably connected to the fourth end; and
   a second linking rod having a seventh end and an eighth end, wherein the seventh end is slidably and rotatably connected to the fourth end, and the eighth end is rotatably connected to the second end,
   wherein the sixth end has a groove portion and a first inclined surface, the eighth end has a second inclined surface, and the first inclined surface contacts the second inclined surface,
   wherein the first inclined surface is located between the groove portion and the second inclined surface.

2. The hinge assembly as recited in claim 1, wherein when the first fixing block and the second fixing block, from a parallel state, are rotated with respect to each other such that an included angle therebetween becomes smaller, the sixth end and the eighth end are driven to rotate with respect to each other too, and a degree of interference between the first inclined surface and the second inclined surface increases so as to provide a torsion via elastic deformation provided by the groove portion, thereby securing the first fixing block and the second fixing block at a predetermined angle.

3. The hinge assembly as recited in claim 1, wherein the sixth end is a pair of coupling arms, each of the pair of coupling arms has the groove portion and the first inclined surface, and the two first inclined surfaces are located between the two groove portions.

4. The hinge assembly as recited in claim 1, further comprising a plurality of first sliding shafts, wherein the second end has a first sub-portion and a second sub-portion, each of the first sub-portion and the second sub-portion has a sliding slot, and the plurality of first sliding shafts correspondingly pass through the sliding slots and are fixed into the fifth end.

5. The hinge assembly as recited in claim 4, wherein the second end further has a third sub-portion, the third sub-portion is located between the first sub-portion and the second sub-portion, and the eighth end is rotatably connected to the third sub-portion.

6. The hinge assembly as recited in claim 1, further comprising a plurality of second sliding shafts, wherein the fourth end has a fourth sub-portion and a fifth sub-portion, each of the fourth sub-portion and the fifth sub-portion has a sliding slot, and the plurality of second sliding shafts correspondingly pass through the sliding slots and are fixed into the seventh end.

7. The hinge assembly as recited in claim 4 or 6, further comprising a plurality of first washers, wherein a shaft portion of the plurality of first sliding shafts passes through a corresponding one of the plurality of first washers to penetrate into a corresponding one of the sliding slots.

8. The hinge assembly as recited in claim 7, further comprising a plurality of second washers, wherein the shaft portions pass through the first washers and the second washers correspondingly in sequence to penetrate into the corresponding sliding slots.

9. The hinge assembly as recited in claim 5, further comprising a first fixing shaft, wherein the eighth end has a pair of first shaft holes, and the first fixing shaft penetrates through the pair of first shaft holes and the third sub-portion.

10. The hinge assembly as recited in claim 6, further comprising a pair of second fixing shafts, wherein the sixth end has a pair of second shaft holes, and the fourth sub-portion and the fifth sub-portion are rotatably connected to the pair of second shaft holes of the sixth end by the second fixing shafts.

11. The hinge assembly as recited in claim 1, further comprising a third fixing shaft, wherein the sixth end has a pair of third shaft holes, the eighth end has a pair of fourth shaft holes, and the third fixing shaft passes through the pair of third shaft holes and the pair of fourth shaft holes.

12. An electronic device, comprising:
a first casing and a second casing;
a hinge assembly comprising:
a first fixing block having a first end and a second end, wherein the first end is attached to a first casing;
a second fixing block having a third end and a fourth end, wherein the third end is attached to a second casing;
a first linking rod having a fifth end and a sixth end, wherein the fifth end is slidably and rotatably connected to the second end, and the sixth end is rotatably connected to the fourth end; and
a second linking rod having a seventh end and an eighth end, wherein the seventh end is slidably and rotatably connected to the fourth end, and the eighth end is rotatably connected to the second end,
wherein the sixth end has a groove portion providing elastic deformation and a first inclined surface, the eighth end has a second inclined surface, and the first inclined surface contacts the second inclined surface.

13. The electronic device as recited in claim 12, wherein the first casing has a first display portion, and the second casing has a second display portion.

14. The electronic device as recited in claim 13, wherein when an included angle between the first casing and the second casing is 180 degrees, a first display surface of the first display portion and a second display surface of the second display portion are coplanar.

15. A hinge assembly, comprising:
a first fixing block;
a second fixing block;
a first linking rod slidably and rotatably connected to the first fixing block and rotatably connected to the second fixing block; and
a second linking rod slidably and rotatably connected to the second fixing block, rotatably connected to the first fixing block, and rotatably connected to the first linking rod,
wherein the first linking rod further has a groove portion disposed between the first fixing block, the second fixing block and the second linking rod,
wherein the first linking rod further has a first inclined surface, the second linking rod further has a second inclined surface, and the first inclined surface contacts the second inclined surface,
wherein the first inclined surface is located between the groove portion and the second inclined surface.

16. An electronic device, comprising:
a first casing;
a second casing;
a first fixing block attached to the first casing;
a second fixing block attached to the second casing;
a first linking rod slidably and rotatably connected to the first fixing block and rotatably connected to the second fixing block; and
a second linking rod slidably and rotatably connected to the second fixing block, rotatably connected to the first fixing block, and rotatably connected to the first linking rod,
wherein the first linking rod further has a groove portion disposed between the first fixing block, the second fixing block and the second linking rod,
wherein the first linking rod further has a first inclined surface, the second linking rod further has a second inclined surface, and the first inclined surface contacts the second inclined surface,
wherein the first inclined surface is located between the groove portion and the second inclined surface.

17. The electronic device as recited in claim 16, wherein when an included angle between the first casing and the second casing is 180 degrees, a first casing surface of the first casing and a second casing surface of the second casing are coplanar.

* * * * *